US008542501B2

(12) United States Patent
Kyono

(10) Patent No.: US 8,542,501 B2
(45) Date of Patent: Sep. 24, 2013

(54) SWITCHING POWER-SUPPLY APPARATUS

(75) Inventor: Yoichi Kyono, Niiza (JP)

(73) Assignee: Sanken Electric Co., Ltd., Niiza-shi (JP)

( * ) Notice: Subject to any disclaimer, the term of this patent is extended or adjusted under 35 U.S.C. 154(b) by 295 days.

(21) Appl. No.: 12/990,390

(22) PCT Filed: Oct. 27, 2009

(86) PCT No.: PCT/JP2009/068424
§ 371 (c)(1),
(2), (4) Date: Oct. 29, 2010

(87) PCT Pub. No.: WO2010/050476
PCT Pub. Date: May 6, 2010

(65) Prior Publication Data
US 2011/0051468 A1    Mar. 3, 2011

(30) Foreign Application Priority Data

Oct. 30, 2008  (JP) ................................ 2008-279867

(51) Int. Cl.
*H02M 3/335*    (2006.01)
(52) U.S. Cl.
USPC ................. 363/21.02; 363/21.06; 363/21.14; 363/21.17; 363/21.18
(58) Field of Classification Search
USPC .................. 363/21.02–21.18, 15, 16, 65, 71, 363/95, 97, 131
See application file for complete search history.

(56) References Cited

U.S. PATENT DOCUMENTS 5,946,206 A * 8/1999 Shimizu et al. ................. 363/65
6,292,377 B1   9/2001 Sasaki
(Continued)

FOREIGN PATENT DOCUMENTS

CN    1551470 A    12/2004
CN    101278468 A   10/2008
(Continued)

OTHER PUBLICATIONS

U.S. Appl. No. 13/494,342, filed Jun. 12, 2012, Kyono.
(Continued)

*Primary Examiner* — Adolf Berhane
*Assistant Examiner* — Yemane Mehari
(74) *Attorney, Agent, or Firm* — Oblon, Spivak, McClelland, Maier & Neustadt, L.L.P.

(57) ABSTRACT

A switching power-supply apparatus includes a first converter 3, a second converter 4, an output smoothing capacitor Co1, a series resonance circuit 1 and a control circuit 11. The first converter 3, in which switching elements Q11 and Q12 are connected to both ends of a direct-current power-supply Vin in series, and a capacitor Ci1 and a primary winding Np1 of a transformer T1 including an auxiliary winding Na1 are connected to both ends of the switching element Q12 in series, includes diodes D11 and D12 that rectify voltages generated in secondary windings Ns11 and Ns12 of the transformer T1. The second converter 4, in which switching elements Q21 and Q22 are connected to the both ends of the direct-current power-supply Vin in series, and a capacitor Ci12 and a primary winding Np2 of a transformer T2 are connected to both ends of the switching element Q22 in series, includes diodes D21 and D22 that rectify voltages generated in secondary windings Ns21 and Ns22 of the transformer T2. The output smoothing capacitor Co1 smoothes currents output from the diodes D11, D12, D21 and D22. The series resonance circuit 1 includes a resonance reactor L1 and a resonance capacitor C1 connected to the auxiliary winding Na1 in series. The control circuit 11 turns on/off the switching elements Q21 and Q22 according to a current flowing in the series resonance circuit 1.

16 Claims, 11 Drawing Sheets

(56) References Cited

U.S. PATENT DOCUMENTS

| | | |
|---|---|---|
| 7,315,460 B2 | 1/2008 | Kyono |
| 7,339,799 B2 | 3/2008 | Osaka et al. |
| 7,375,987 B2 | 5/2008 | Kyono |
| 7,629,781 B2 | 12/2009 | Kyono |
| 7,777,422 B2 * | 8/2010 | Kohno et al. ............. 315/209 R |
| 8,149,599 B2 * | 4/2012 | Coccia et al. ............. 363/21.02 |
| 8,259,477 B2 * | 9/2012 | Jin et al. ........................... 363/69 |
| 2004/0233685 A1 | 11/2004 | Matsuo et al. |
| 2008/0298093 A1 | 12/2008 | Jin et al. |
| 2009/0108767 A1 | 4/2009 | Kohno et al. |
| 2009/0256423 A1 | 10/2009 | Kyono |
| 2010/0046251 A1 | 2/2010 | Kyono |
| 2010/0109434 A1 | 5/2010 | Kyono |
| 2010/0172159 A1 | 7/2010 | Kyono |
| 2011/0002146 A1 | 1/2011 | Kyono |

FOREIGN PATENT DOCUMENTS

| | | |
|---|---|---|
| EP | 2073366 A1 * | 6/2009 |
| JP | 60 244120 | 12/1985 |
| JP | 4 105552 | 4/1992 |
| JP | 2001 8452 | 1/2001 |
| JP | 2002 218753 | 8/2002 |
| JP | 2002 325444 | 11/2002 |
| JP | 2004 112926 | 4/2004 |
| JP | 2004 260993 | 9/2004 |

OTHER PUBLICATIONS

International Search Report issued Jan. 19, 2001 in PCT/JP09/68424 filed Oct. 27, 2009.

Office Action issued Jan. 19, 2010 in Japanese Patent Application No. 2008-279867 filed Oct. 30, 2008. (with English language translation).

Office Action and Search Report issued Nov. 5, 2012 in Chinese Patent Application No. 200980115402.3 with English language translation and English translation of categories of cited documents.

Taiwanese Office Action mailed on May 24, 2013, issued for Taiwan Patent Application No. 98136393 (with English translation), 9 pages.

* cited by examiner

SWITCHING POWER-SUPPLY APPARATUS

TECHNICAL FIELD

The present invention relates to a simple and low-priced switching power-supply apparatus.

BACKGROUND ART

FIG. 1 is a circuit diagram illustrating a configuration of a conventional switching power-supply apparatus. For example, the switching power-supply apparatus shown in FIG. 1 inputs a direct-current voltage as a direct-current input voltage Vin, which is generated by rectifying and smoothing an alternating-current voltage from a commercial power-supply, in a system called as a current resonance type switching power-supply apparatus. A switching element (first switching element) Q11 consisting of MOSFET and a switching element (second switching element) Q12 consisting of MOSFET are connected in series to both ends of a direct-current power-supply Vin for supplying the direct-current input voltage Vin.

A voltage resonance capacitor Cv1 and a first resonance circuit which includes a resonance reactor Lr1, a primary winding Np1 of a transformer T1 and a current resonance capacitor Ci1, are connected between a drain and a source of the switching element Q12 (they may be connected between a drain and a source of the switching element Q11). For example, a leakage inductance of the transformer T1 is substituted for the resonance reactor Lr1.

A diode D1 is connected between the drain and the source of the switching element Q12. A diode D2 is connected between the drain and the source of the switching element Q11. The diodes D1 and D2 may be parasitic diodes of the switching elements Q11 and Q12.

Also, secondary windings Ns11 and Ns12, each of which is wound to have a reversed phase with respect to the other winding, are connected in series at a secondary side of the transformer T1. Voltages generated in the secondary windings Ns11 and Ns12 are rectified by diodes D11 and D12, smoothed by an output smoothing capacitor Co1, and output as an output voltage Vo1.

Gate signals each of which has a dead time for preventing the switching elements Q11 and Q12 from being turned on simultaneously, are alternately input into gates of the switching elements Q11 and Q12 from a control circuit 10, with the same turn-on width.

When the switching elements Q11 and Q12 are alternately turned on/off, resonance currents Q11$i$ and Q12$i$ shown in FIG. 2 flow in the switching elements Q11 and Q12, which flows sinusoidal resonance currents D11$i$ and D12$i$ through the diodes D11 and D12 at the secondary side of the transformer T1.

The output voltage Vo1 is returned to the control circuit 10 located at a primary side via an insulation means such as a photo coupler not shown. Switching frequencies of the switching elements Q11 and Q12 are controlled such that the output voltage Vo1 has a certain value using the control circuit 10.

In this current resonance type switching power-supply apparatus, as shown in FIG. 2, when the respective switching elements Q11 and Q12 are turned on, switching loss does not occur because respective currents flow in a minus direction (respective currents flowing through the diodes D11 and D12). Also, when the respective switching elements Q11 and Q12 are turned off, a surge voltage does not occur because resonance working is carried out. Thus, low-voltage switching elements can be employed and it is an extremely-effective system for configuring a highly-efficient power-supply.

However, in the current resonance type switching power-supply apparatus shown in FIG. 1, the currents D11$i$ and D12$i$ have discontinuous changes because the sinusoidal resonance currents D11$i$ and D12$i$ alternately flow at the secondary side. Thus, a ripple current Co1$i$ which flows in the output smoothing capacitor Co1, is about fifty to seventy percents of the output current, and is large in comparison with a forward converter in which a current has a continuous change. An electrolytic capacitor which is generally employed as the output smoothing capacitor Co1, has a regulation about an allowable ripple current. In order to meet the regulation, a plurality of electrolytic capacitors must be connected in parallel. This brings a problem that a cost and a mounting area increase.

In order to resolve this problem, Patent Literature 1 discloses a method for reducing a ripple current of an electrolytic capacitor by connecting a plurality of circuits in parallel and working the respective circuits while shifting phases of the respective circuits.

CITATION LIST

Patent Literature

Patent Document 1: Japanese Patent Application Laid-Open No. H04-105552.

SUMMARY OF INVENTION

Technical Problem

However, the system of Patent Literature 1 needs a circuit for dividing a frequency of pulse signal from a high frequency oscillation circuit in a control circuit. This brings a problem that the control circuit is complicated and it is expensive.

The present invention provides a switching power-supply apparatus that realizes concurrent working with being out of phase using a simple and low-priced circuit.

Solution to Problem

In order to resolve the problem, the first invention comprises: a first converter in which a first switching element and a second switching element are connected to both ends of a direct-current power-supply in series, and a first capacitor and a primary winding of a first transformer including an auxiliary winding are connected to both ends of the first switching element or the second switching element in series, wherein the first converter includes a first rectifying circuit that rectifies a voltage generated in a secondary winding of the first transformer; a second converter in which a third switching element and a fourth switching element are connected to the both ends of the direct-current power-supply in series, and a second capacitor and a primary winding of a second transformer are connected to both ends of the third switching element or the fourth switching element in series, wherein the second converter includes a second rectifying circuit that rectifies a voltage generated in a secondary winding of the second transformer; a smoothing circuit that smoothes currents output from the first rectifying circuit and the second rectifying circuit; a series resonance circuit that includes a resonance reactor and a resonance capacitor and is connected to the auxiliary winding in series; and a control circuit that turns on/off the third switching element and the fourth switching element according to a current flowing in the series resonance circuit.

The second invention comprises: a first converter in which a first switching element and a second switching element are connected to both ends of a direct-current power-supply in series, and a first capacitor and a primary winding of a first transformer including an first auxiliary winding and a second auxiliary winding, each of which is wound to have a reversed polarity with respect to the other winding, are connected to both ends of the first switching element or the second switching element in series, wherein the first converter includes a first rectifying circuit that rectifies a voltage generated in a secondary winding of the first transformer; a second converter in which a third switching element and a fourth switching element are connected to the both ends of the direct-current power-supply in series, and a second capacitor and a primary winding of a second transformer are connected to both ends of the third switching element or the fourth switching element in series, wherein the second converter includes a second rectifying circuit that rectifies a voltage generated in a secondary winding of the second transformer; a smoothing circuit that smoothes currents output from the first rectifying circuit and the second rectifying circuit; a first series resonance circuit that includes a first resonance reactor and a first resonance capacitor and is connected to the first auxiliary winding in series; a first control circuit that turns on/off the third switching element according to a current of the first series resonance circuit; a second series resonance circuit that includes a second resonance reactor and a second resonance capacitor and is connected to the second auxiliary winding in series; and a second control circuit that turns on/off the fourth switching element according to a current of the second series resonance circuit.

The third invention comprises: a first converter in which a first switching element and a second switching element are connected to both ends of a direct-current power-supply in series, and a first capacitor and a primary winding of a first transformer are connected to both ends of the first switching element or the second switching element in series, wherein the first converter includes a first rectifying circuit that rectifies a voltage generated in a secondary winding of the first transformer; a second converter in which a third switching element and a fourth switching element are connected to the both ends of the direct-current power-supply in series, and a second capacitor and a primary winding of a second transformer are connected to both ends of the third switching element or the fourth switching element in series, wherein the second converter includes a second rectifying circuit that rectifies a voltage generated in a secondary winding of the second transformer; a smoothing circuit that smoothes currents output from the first rectifying circuit and the second rectifying circuit; a series resonance circuit that includes a resonance reactor and a resonance capacitor connected to the both ends of the first switching element or the second switching element; and a control circuit that turns on/off the third switching element and the fourth switching element according to a current flowing in the series resonance circuit.

The fourth invention comprises: a first converter in which a first switching element and a second switching element are connected to both ends of a direct-current power-supply in series, a first capacitor and a primary winding of a first transformer are connected to both ends of the first switching element or the second switching element in series, and a third capacitor and a primary winding of a third transformer including a first secondary winding and a second secondary winding, each of which is wound to have a reversed polarity with respect to the other winding, are connected to the both ends of the first switching element or the second switching element in series, wherein the first converter includes a first rectifying circuit that rectifies a voltage generated in a secondary winding of the first transformer; a second converter in which a third switching element and a fourth switching element are connected to the both ends of the direct-current power-supply in series, and a second capacitor and a primary winding of a second transformer are connected to both ends of the third switching element or the fourth switching element in series, wherein the second converter includes a second rectifying circuit that rectifies a voltage generated in a secondary winding of the second transformer; a smoothing circuit that smoothes currents output from the first rectifying circuit and the second rectifying circuit; a first series resonance circuit that includes a first resonance reactor and a first resonance capacitor and is connected to the first secondary winding of the third transformer in series; a first control circuit that turns on/off the third switching element according to a current of the first series resonance circuit; a second series resonance circuit that includes a second resonance reactor and a second resonance capacitor and is connected to the second secondary winding of the third transformer in series; and a second control circuit that turns on/off the fourth switching element according to a current of the second series resonance circuit.

For the fifth invention, a first power factor improvement circuit and a second power factor improvement circuit are substituted for the direct-current power-supply in a switching power-supply apparatus recited in any one of claims 1 to 8, the first power factor improvement circuit turns on/off a rectified voltage generated by rectifying an alternating-current voltage of an alternating-current power-supply using a first switch to improve a power factor, and converts the rectified voltage into a certain direct-current voltage and supplies the certain direct-current voltage to the first converter, and the second power factor improvement circuit turns on/off a rectified voltage generated by rectifying the alternating-current voltage using a second switch to improve a power factor, and converts the rectified voltage into a direct-current voltage with a turn-on width which is the same as a turn-on width of the first switch of the first power factor improvement circuit and supplies the direct-current voltage to the second converter.

For the sixth invention, a voltage dividing direct-current power-supply is substituted for the direct-current power-supply in a switching power-supply apparatus recited in any one of claims 1 to 8, a first voltage dividing capacitor and a second voltage dividing capacitor are connected to both ends of the voltage dividing direct-current power-supply in series, a direct-current voltage of the first voltage dividing capacitor is supplied to the first converter, and a direct-current voltage of the second voltage dividing capacitor is supplied to the second converter.

The seventh invention comprises: a series resonance circuit that includes a resonance reactor and a resonance capacitor; a first converter that includes at least one first transformer having a winding connected to the series resonance circuit in series, wherein an input electric power is input from a first direct-current power-supply by turn on/off working of a first switch circuit and an output electric power is output from a secondary side of the first transformer or a secondary side of another transformer; a second converter that includes a second transformer, wherein an input electric power is input from the first direct-current power-supply or a second direct-current power-supply by turn on/off working of a second switch circuit and an output electric power is output from a secondary side of the second transformer; a rectifying and smoothing circuit that rectifies and smoothes output electric powers output from the first converter and the second converter to obtain a direct-current output; and a control circuit that controls the turn on/off working of the second switch circuit according to a current in the series resonance circuit.

Advantageous Effects of Invention

According to the present invention, the control circuit turns on/off the switching elements of the second converter according to a current in the series resonance circuit including the resonance reactor and the resonance capacitor. Thus, a current released from the second converter to an output is out of phase with a current output from the first converter. Therefore, concurrent working with being out of phase can be realized by only adding a simple circuit, which largely reduces a ripple current of the output smoothing capacitor.

DESCRIPTION OF EMBODIMENTS

Exemplary embodiments of a switching power-supply apparatus of the present invention will be described in detail below with reference to figures.

Exemplary Embodiment 1

Figure 3:
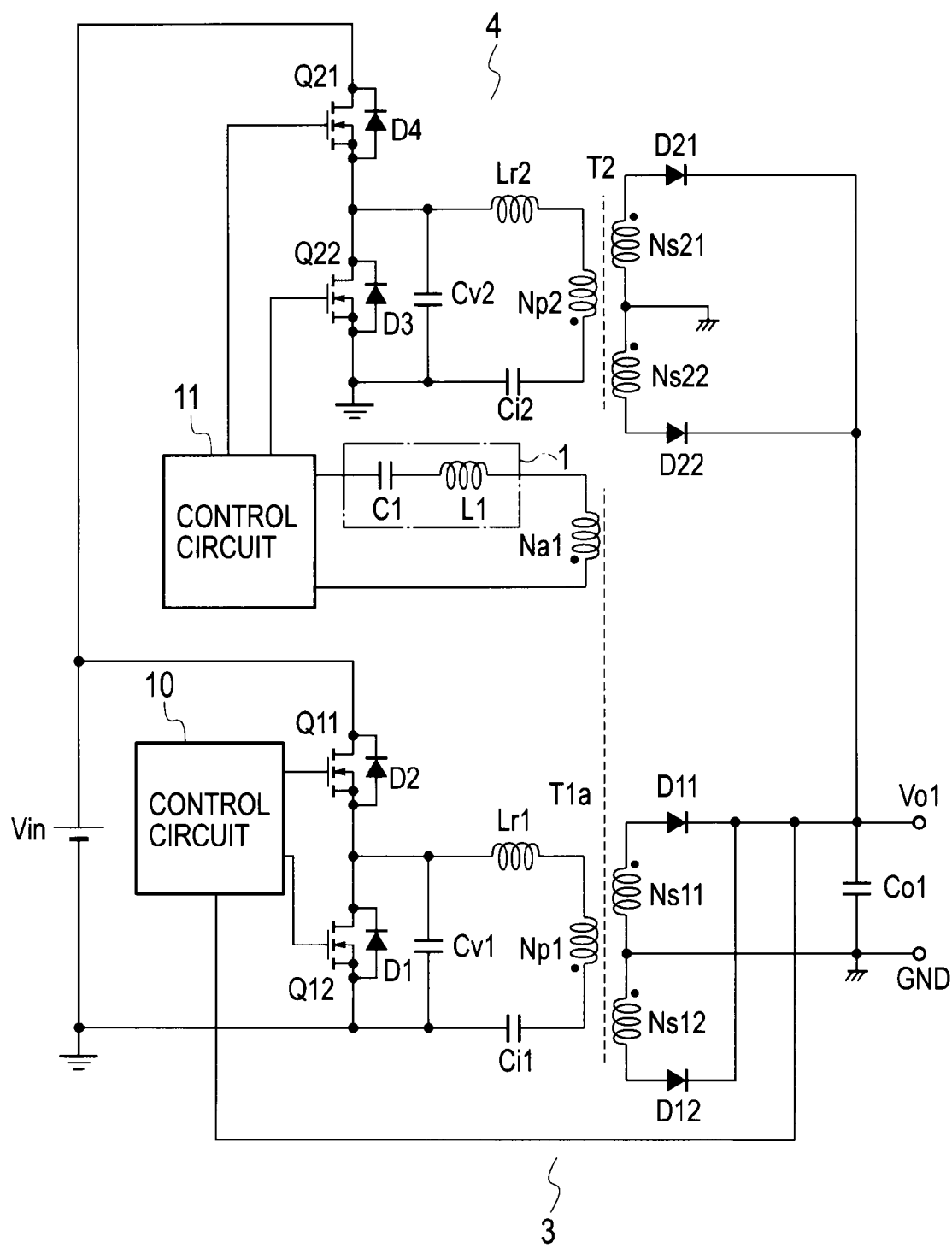
FIG. 3 It is a circuit diagram illustrating a configuration of a switching power-supply apparatus according to an exemplary embodiment 1 of the present invention.

FIG. 3 is a circuit diagram illustrating a configuration of a switching power-supply apparatus according to an exemplary embodiment 1 of the present invention. The switching power-supply apparatus shown in FIG. 3 includes a direct-current power-supply Vin (first direct-current power-supply), a first converter 3, a second converter 4 and an output smoothing capacitor Co1.

Figure 1:
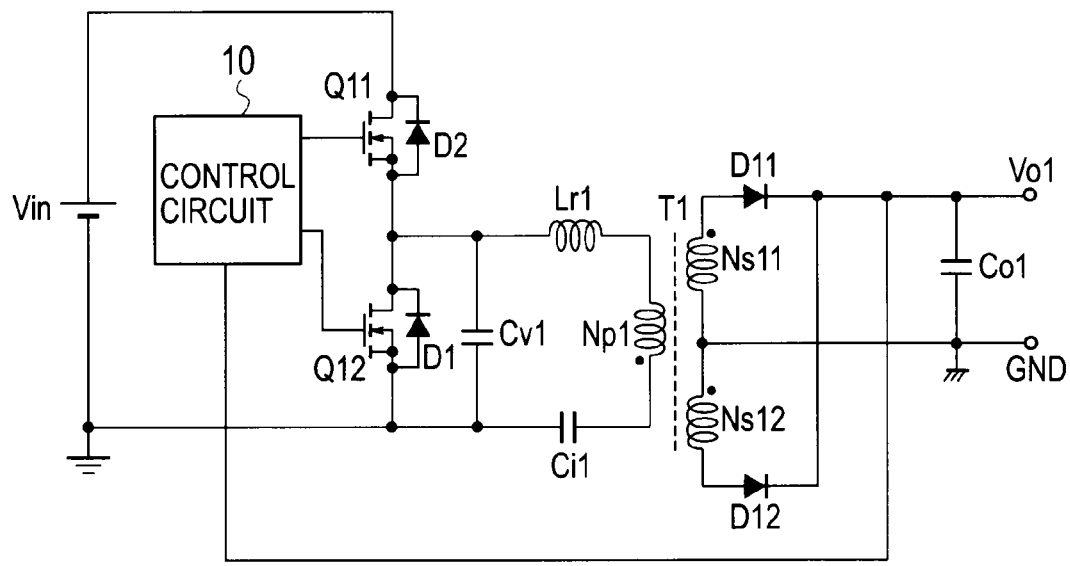
FIG. 1 It is a circuit diagram illustrating a configuration of a conventional switching power-supply apparatus.
Figure 2:
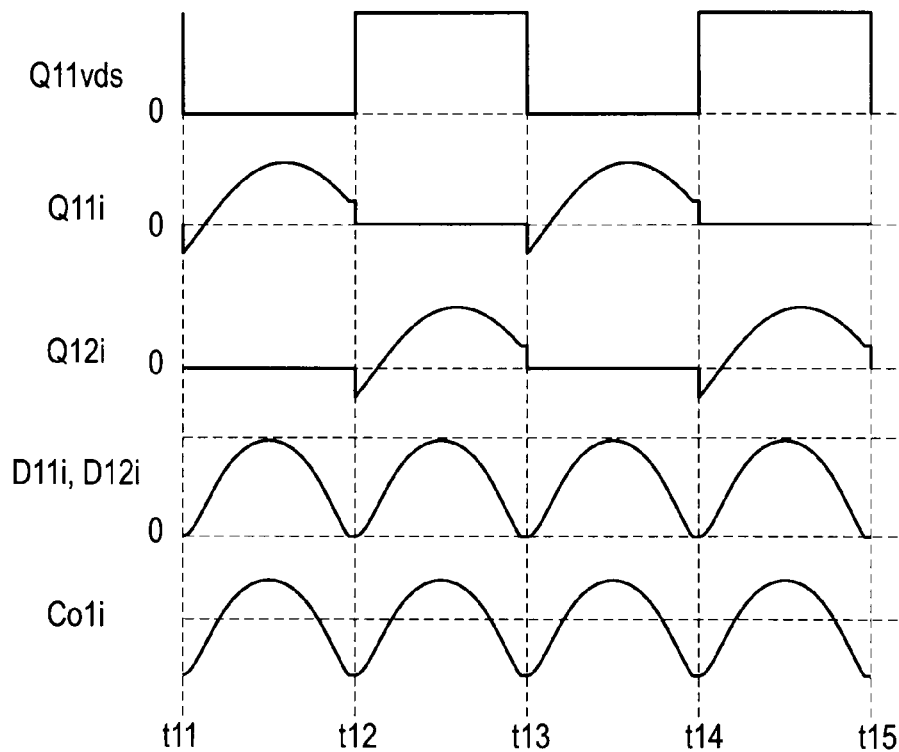
FIG. 2 It is a waveform diagram illustrating working of the conventional switching power-supply apparatus.

The first converter 3 differs in a configuration where a transformer T1a (first transformer) including a primary winding Np1, secondary windings Ns11 and Ns12 and an auxiliary winding Na1 is provided in the conventional switching power-supply apparatus shown in FIG. 1. An explanation of other elements is omitted because they are the same as those in the conventional switching power-supply apparatus.

As well as the first converter 3, for the second converter 4, a switching element Q21 (third switching element) consisting of MOSFET and a switching element Q22 (fourth switching element) consisting of MOSFET are connected in series to both ends of the direct-current power-supply Vin.

It is noted that the switching element Q11 and the switching element Q12 constitute a first switch circuit and the switching element Q21 and the switching element Q22 constitute a second switch circuit.

A voltage resonance capacitor Cv2 and a second resonance circuit which includes a resonance reactor Lr2, a primary winding Np2 of a transformer T2 (second transformer) and a current resonance capacitor Ci2, are connected between a drain and a source of the switching element Q22 (they may be connected between a drain and a source of the switching element Q21). For example, a leakage inductance of the transformer T2 is substituted for the resonance reactor Lr2.

A diode D3 is connected between the drain and the source of the switching element Q22. A diode D4 is connected between the drain and the source of the switching element Q21. The diodes D3 and D4 may be parasitic diodes of the switching elements Q21 and Q22.

Also, secondary windings Ns21 and Ns22, each of which is wound to have a reversed phase (reversed polarity) with respect to the other winding, are connected in series at a secondary side of the transformer T2. Voltages generated in the secondary windings Ns21 and Ns22 are rectified by diodes D21 and D22, smoothed by the output smoothing capacitor Co1, and output as an output voltage Vo1.

It is noted that the diodes D11, D12, D21 and D22 and the output smoothing capacitor Co1 constitute a rectifying and smoothing circuit.

A control circuit 11 is connected to gates of the switching elements Q21 and Q22. A series resonance circuit (series resonance circuit) which includes a resonance capacitor C1 and a resonance reactor L1 connected to the auxiliary winding Na1 of the transformer T1a, is connected to the control circuit 11.

Figure 4:
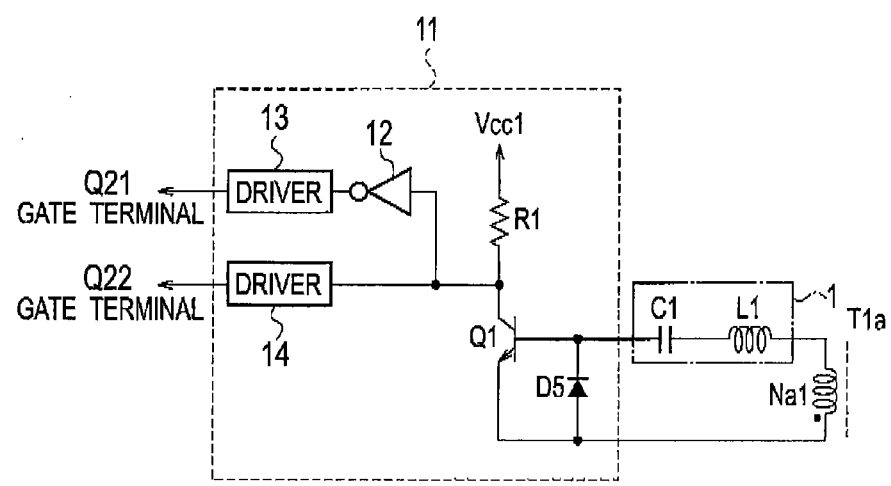
FIG. 4 It is an inner circuit diagram of a control circuit 11 in the switching power-supply apparatus according to the exemplary embodiment 1.

FIG. 4 is an inner circuit diagram of the control circuit 11 in the switching power-supply apparatus according to the exemplary embodiment 1. In the control circuit 11 shown in FIG. 4, a commutation diode D5 and a series circuit which includes the series resonance circuit 1 and the auxiliary winding Na1 of the transformer T1a, are connected between a base and an emitter of a transistor Q1.

For example, a collector of the transistor Q1 is connected to a drive power-supply Vcc1 in the control circuit 11 via a resistor R1. A driver 14 is connected to a connection point of the collector of the transistor Q1 and the resistor R1. An output of the driver 14 is connected to the gate of the switching element Q22.

Also, an inverter circuit 12 is connected to a connection point of the collector of the transistor Q1 and the resistor R1. An output of the inverter circuit 12 is connected to the gate of the switching element Q21 via a driver 13. The driver 13 includes therein a level shift circuit (not shown) in which a signal based on a ground potential is converted into a signal based on a connection point of the switching Q21 and the switching Q22.

Figure 5:
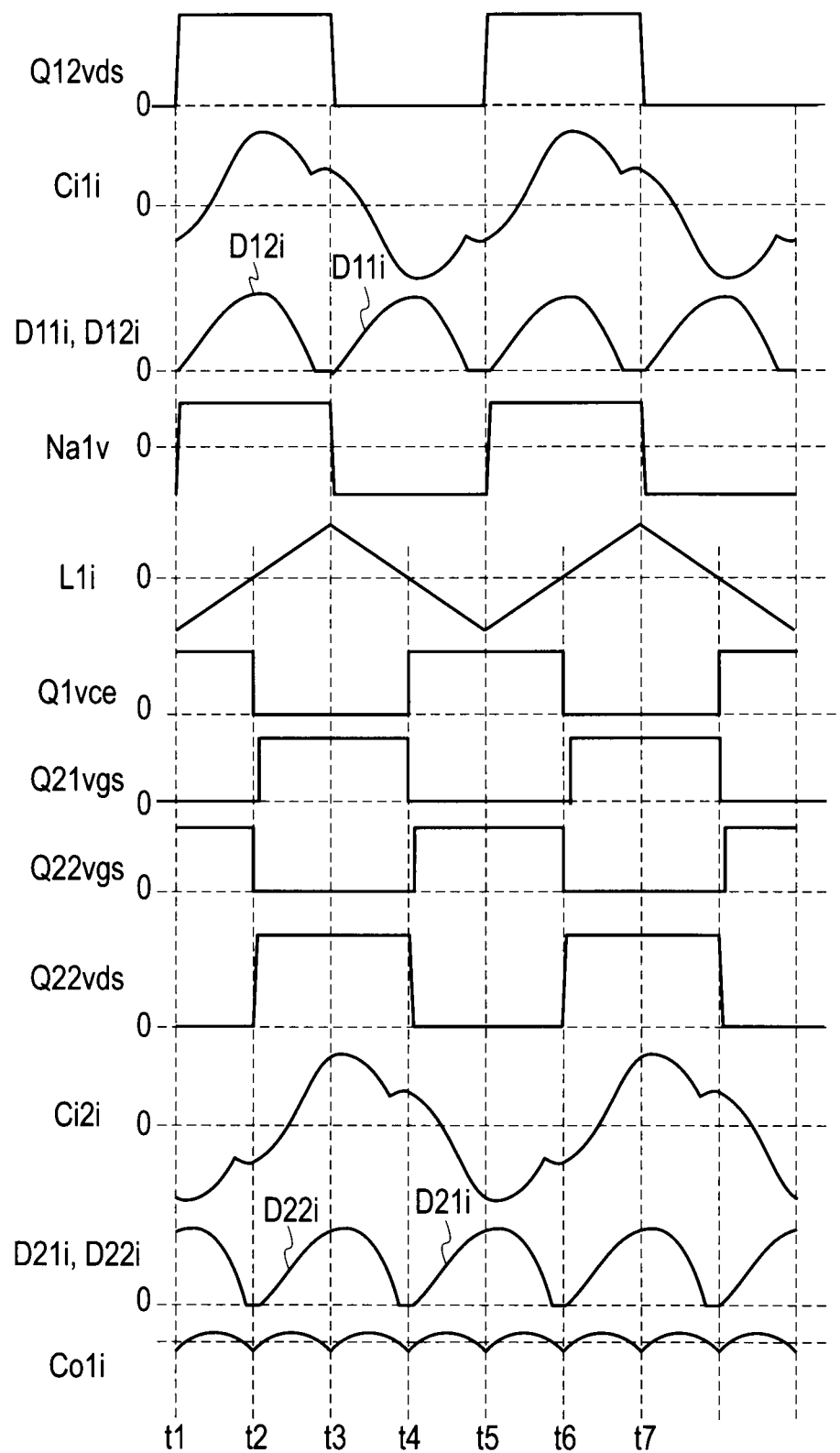
FIG. 5 It is a waveform diagram illustrating working of the switching power-supply apparatus according to the exemplary embodiment 1.

Next, working of the switching power-supply apparatus according to the exemplary embodiment 1 configured in this manner will be described with reference to working waveform diagram shown in FIG. 5.

First, as well as the conventional example shown in FIG. 1, the first converter 3 continues to alternately turn on/off the switching element Q11 and the switching element Q12 with the same turn-on width, which flows sinusoidal resonance currents D11$i$ and D12$i$ at the secondary side of the transformer T1$a$.

The switching element Q11 and the switching element Q12 are alternately turned on/off, which generates an alternating-current voltage Na1$v$ having a rectangular wave form symmetrically formed on positive and negative regions in the auxiliary winding Na1 of the transformer T1$a$. When the alternating-current voltage Na1$v$ is applied to the series resonance circuit 1 which includes the resonance capacitor C1 and the resonance reactor L1, a current L1$i$ with a triangle wave form flows between the base and the emitter of the transistor Q1 or through the diode D5 in the series resonance circuit 1.

When the alternating-current voltage Na1$v$ is applied to the series resonance circuit 1 which includes the resonance capacitor C1 and the resonance reactor L1, a phase of current is delayed by 90 degrees with respect to a phase of voltage. Due to this, the current L1$i$ flowing in the series resonance circuit 1 is shifted into positive or negative at a middle point (e.g., a time t2) of a turn-on period of the switching elements Q11 and Q12.

Since the current L1$i$ flows as a base current of the transistor Q1, a collector voltage Q1$vce$ of the transistor Q1 is switched in a voltage level at the middle point (e.g., the time t2) of the turn-on period of the switching elements Q11 and Q12.

A collector voltage of the transistor Q1 is output as a gate signal Q22$vgs$ of the switching element Q22 through the driver 14. Also, the collector voltage of the transistor Q1 inverted by the inverter circuit 12 is output as a gate signal Q21$vgs$ of the switching element Q21 through the driver 13.

It is noted that the drivers 13 and 14 include therein a delay circuit for preventing the switching elements Q21 and Q22 from turning on simultaneously.

Since these gate signals Q21$vgs$ and Q22$vgs$ are input into the gates of the switching elements Q21 and Q22, the second converter 4 works to be out of phase with the first converter 3 by 90 degrees while having the same frequency as the first converter 3.

In a case where resonance time constants of the resonance reactor Lr2, the primary winding Np2 of the transformer T2, and the current resonance capacitor Ci2 which constitute the second resonance circuit have the same values as those of the resonance reactor Lr1, the primary winding Np1 of the transformer T1$a$, and the current resonance capacitor Ci1 which constitute the first resonance circuit, currents D21$i$ and D22$i$ output from the second converter 4 are out of phase with the currents D11$i$ and D12$i$ output from the first converter 3 by 90 degrees. Thus, a ripple current Co1$i$ which flows in the output smoothing capacitor Co1, decreases by about one-fifth in comparison with the conventional configuration which includes one converter shown in FIG. 1.

According to the switching power-supply apparatus of the exemplary embodiment 1, the control circuit 11 turns on/off the switching elements Q21 and Q22 of the second converter 4 in response to the current L1$i$ of the series resonance circuit 1 which includes the resonance reactor L1 and the resonance capacitor C1. Namely, concurrent working with being out of phase can be realized by only adding a simple circuit, which largely decreases the ripple current Co1$i$ of the output smoothing capacitor Co1.

Exemplary Embodiment 2

Figure 6:
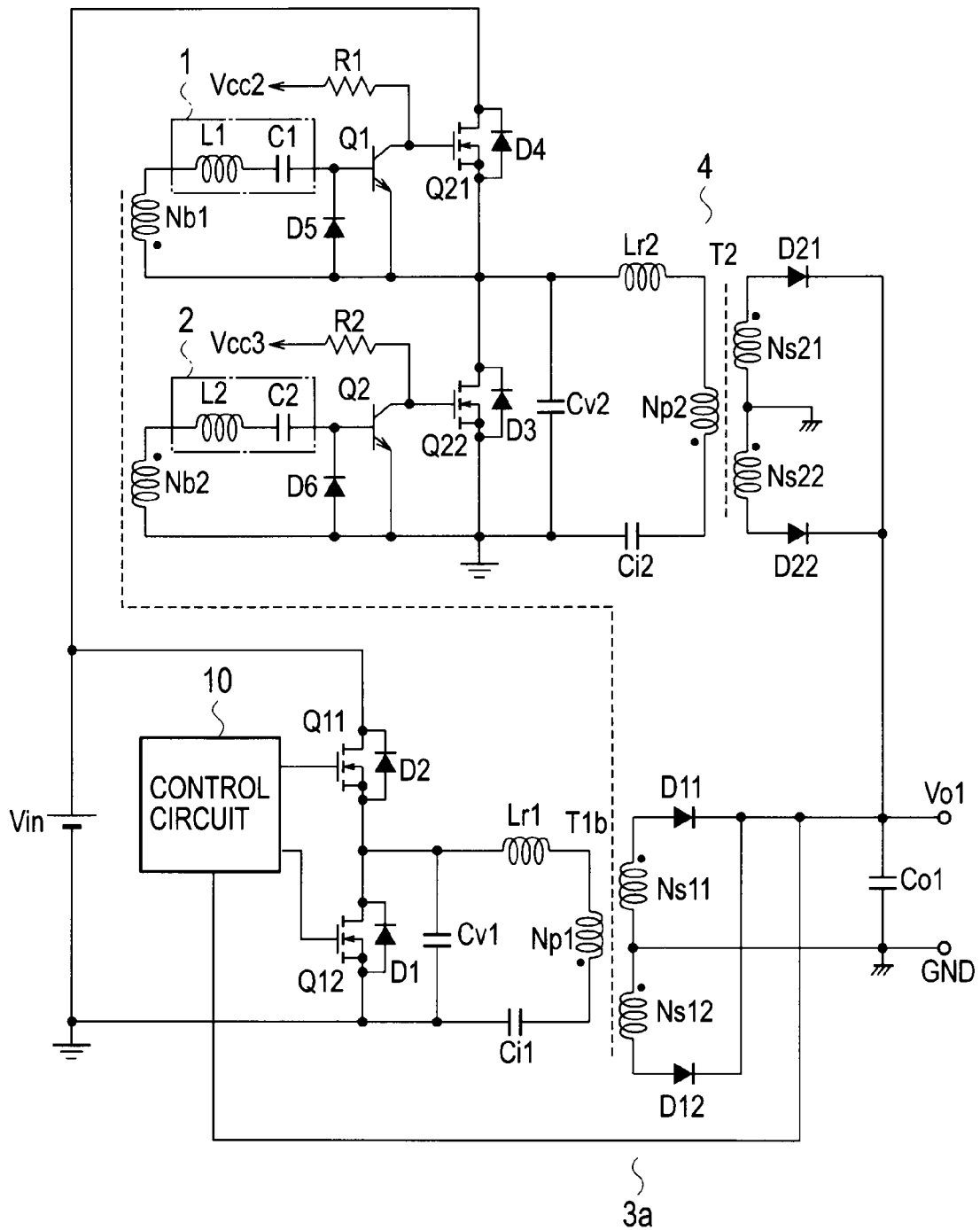
FIG. 6 It is a circuit diagram illustrating a configuration of a switching power-supply apparatus according to an exemplary embodiment 2 of the present invention.

FIG. 6 is a circuit diagram illustrating a configuration of a switching power-supply apparatus according to the exemplary embodiment 2 of the present invention. The switching power-supply apparatus of the exemplary embodiment 2 shown in FIG. 6 differs from the switching power-supply apparatus of the exemplary embodiment 1 shown in FIG. 3 in a transformer T1$b$, transistors Q1 and Q2, and diodes D5 and D6. So, only this portion will be described.

The transformer T1$b$ (first transformer) includes the primary winding Np1, the secondary windings Ns11 and Ns12, and auxiliary windings Nb1 and Nb2. Each of the auxiliary winding Nb1 (first auxiliary winding) and the auxiliary winding Nb2 (second auxiliary winding) is wound to have a reversed phase (reversed polarity) with respect to the other winding.

The commutation diode D5 and a series circuit which includes the series resonance circuit 1 (first series resonance circuit) including the resonance reactor L1 and the resonance capacitor C1 and the auxiliary winding Nb1 of the transformer T1$b$, are connected between the base and the emitter of the transistor Q1 (first control circuit). The emitter of the transistor Q1 is connected to the source of the switching element Q21. The collector of the transistor Q1 is connected to the gate of the switching element Q21. The collector of the transistor Q1 is connected via the resistor R1 to a drive power-supply Vcc2 which refers to a connection point of the switching element Q21 and the switching element Q22.

The commutation diode D6 and a series circuit which includes a series resonance circuit 2 (second series resonance circuit) including a resonance reactor L2 and a resonance capacitor C2 and the auxiliary winding Nb2 of the transformer T1$b$, are connected between a base and an emitter of the transistor Q2 (second control circuit). The emitter of the transistor Q2 is connected to the source of the switching element Q22. A collector of the transistor Q2 is connected to the gate of the switching element Q22. The collector of the transistor Q2 is connected via a resistor R2 to a drive power-supply Vcc3 which refers to a ground.

Figure 7:
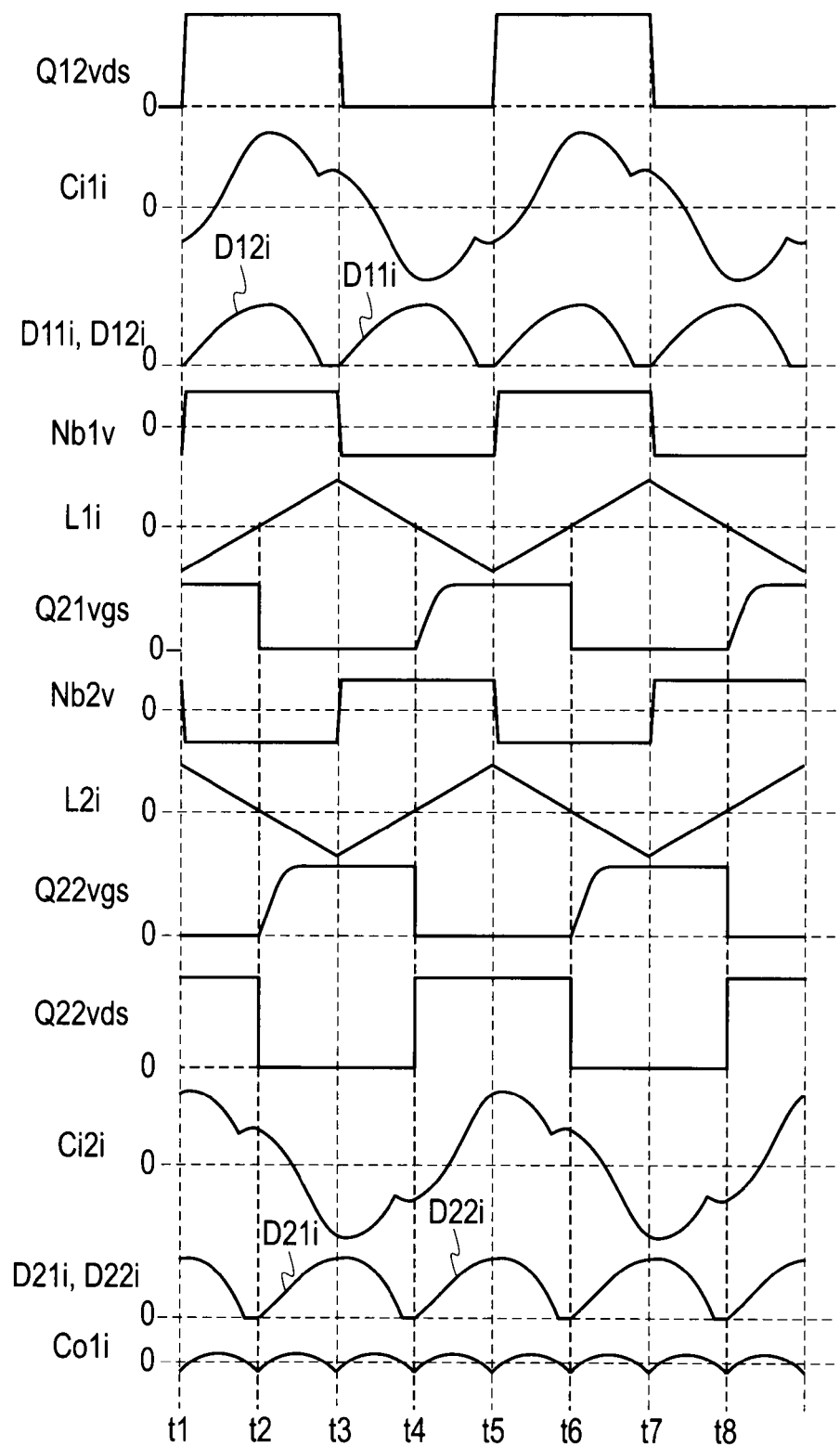
FIG. 7 It is a waveform diagram illustrating working of the switching power-supply apparatus according to the exemplary embodiment 2.

Next, working of the switching power-supply apparatus according to the exemplary embodiment 2 configured in this manner will be described with reference to working waveform diagram shown in FIG. 7.

First, as well as the conventional example shown in FIG. 1, a first converter 3$a$ continues to alternately turn on/off the switching element Q11 and the switching element Q12 with the same turn-on width, which flows sinusoidal resonance currents D11$i$ and D12$i$ at the secondary side of the transformer T1$b$.

The switching element Q11 and the switching element Q12 are alternately turned on/off, which generates alternating-current voltages Nb1$v$ and Nb2$v$, each having a rectangular wave form symmetrically formed on positive and negative regions, as waves in which the alternating-current voltage Nb1$v$ has a positive or negative value when the alternating-current voltage Nb2$v$ has a negative or positive value, in the auxiliary windings Nb1 and Nb2 of the transformer T1$b$. When the alternating-current voltages Nb1$v$ and Nb2$v$ are applied to the series resonance circuits 1 and 2 which include the resonance capacitors C1 and C2 and the resonance reactors L1 and L2, currents L1*i* and L2*i* with triangle wave forms flow between the base and the emitter of the transistor Q1 and between the base and the emitter of the transistor Q2 or through the diodes D5 and D6 in the series resonance circuits 1 and 2.

When the alternating-current voltages Nb1*v* and Nb2*v* are applied to the series resonance circuits 1 and 2 which includes the resonance capacitors C1 and C2 and the resonance reactors L1 and L2, phases of currents are delayed by 90 degrees with respect to phases of these voltages. Due to this, the currents L1*i* and L2*i* flowing in the series resonance circuits 1 and 2 are shifted into positive or negative at a middle point (e.g., a time t2) of the turn-period width of the switching elements Q11 and Q12.

Since the currents L1*i* and L2*i* flow as base currents of the transistors Q1 and Q2, the transistors Q1 and Q2 are turned on during only periods when positive currents flow in the series resonance circuits 1 and 2. Gate signals are input into the switching elements Q21 and Q22 through the resistors R1 and R2 during periods when the transistors Q1 and Q2 are turned off.

Namely, by employing the configuration shown in FIG. 6, since the currents L1*i* and L2*i* of the series resonance circuits 1 and 2 are currents in which the current L1*i* has a positive or negative value when the current L2*i* has a negative or positive value, gate signals Q21*vgs* and Q22*vgs* are alternately input in the switching elements Q21 and Q22 such that the second converter 4 works to be out of phase with the first converter 3*a* by 90 degrees while having the same frequency as the first converter 3*a*.

As well as the exemplary embodiment 1, this decreases the ripple current Co1*i* of the output smoothing capacitor Co1. Also, in comparison with the exemplary embodiment 1, a dead time can be generated by delaying a turn-on time using time constants of the resistors R1 and R2 and gate capacities of the switching elements Q21 and Q22, which allows the delay circuit and the level shift circuit to be eliminated.

Exemplary Embodiment 3

Figure 8:
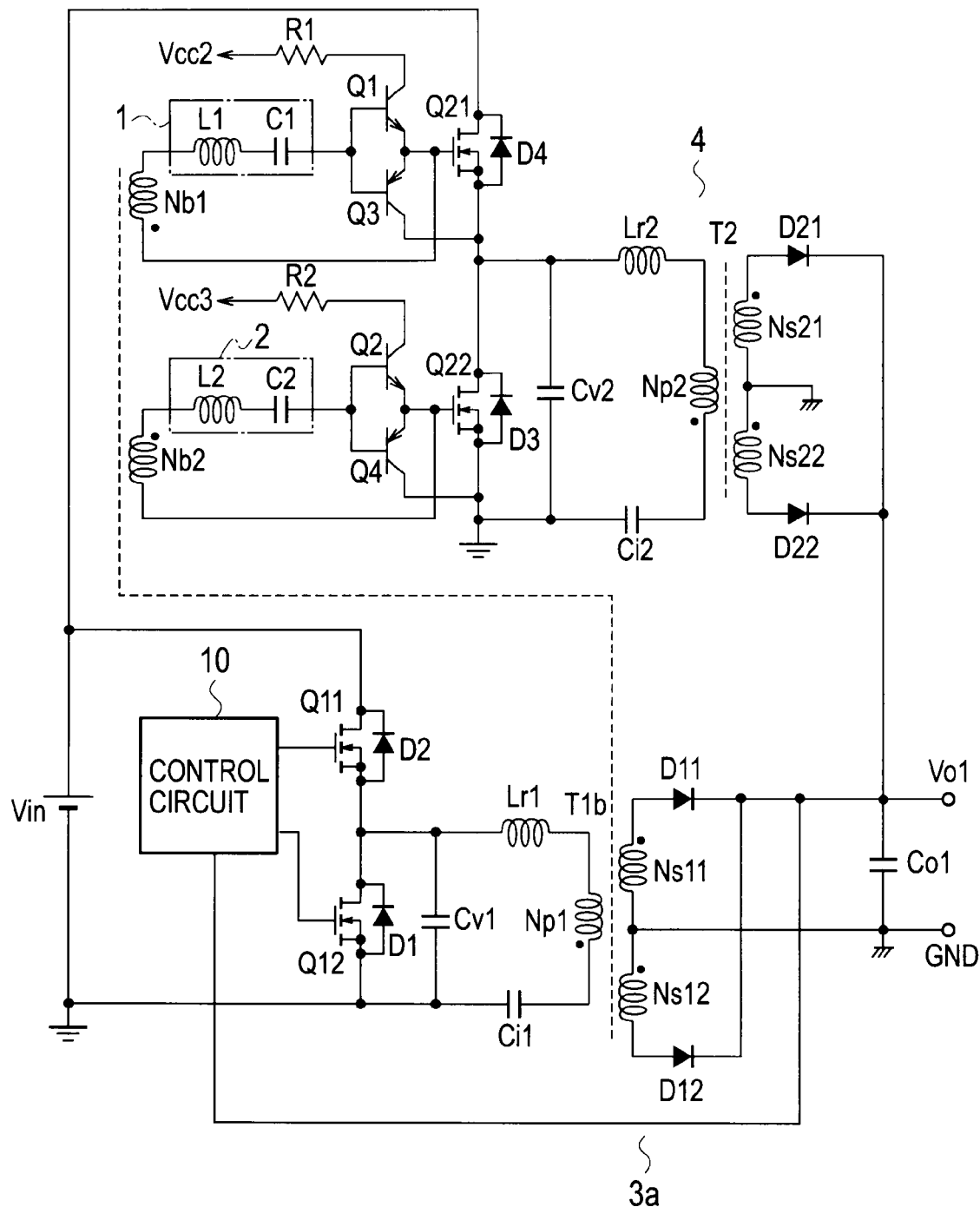
FIG. 8 It is a circuit diagram illustrating a configuration of a switching power-supply apparatus according to an exemplary embodiment 3 of the present invention.

FIG. 8 is a circuit diagram illustrating a configuration of a switching power-supply apparatus according to the exemplary embodiment 3 of the present invention. The switching power-supply apparatus of the exemplary embodiment 3 shown in FIG. 8 differs from the switching power-supply apparatus of the exemplary embodiment 2 shown in FIG. 6 in that transistors Q1 and Q3 (first drive circuit) connected in a totem-pole type and transistors Q2 and Q4 (second drive circuit) connected in a totem-pole type are provided.

One end of the series resonance circuit 1 which includes the resonance reactor L1 and the resonance capacitor C1 is connected to bases of the transistors Q1 and Q3. Emitters of the transistors Q1 and Q3 are connected to the gate of the switching element Q21. A collector of the transistor Q3 is connected to the source of the switching element Q21. A collector of the transistor Q1 is connected to the drive power-supply Vcc2 via the resistor R1.

One end of the series resonance circuit 2 which includes the resonance reactor L2 and the resonance capacitor C2 is connected to bases of the transistors Q2 and Q4. Emitters of the transistors Q2 and Q4 are connected to the gate of the switching element Q22. A collector of the transistor Q4 is connected to the source of the switching element Q22. A collector of the transistor Q2 is connected to the drive power-supply Vcc3 via the resistor R2.

In this configuration, as well as the exemplary embodiment 2, currents with triangle wave forms each symmetrically formed on positive and negative regions such that the second converter 4 works to be out of phase with the first converter 3*a* by 90 degrees, flow between the base and the emitter of the transistor Q1 or between the base and the emitter of the transistor Q3 in the series resonance circuit 1, and between the base and the emitter of the transistor Q2 or between the base and the emitter of the transistor Q4 in the series resonance circuit 2.

When the current in the series resonance circuit 1 or 2 has a positive value, a base current flows into the transistor Q1 or Q2. By amplification working of the transistor Q1 or Q2, a voltage is applied to the gate of the switching element Q21 or Q22 using the drive power-supply Vcc2 or Vcc3.

In contrast, when the current in the series resonance circuit 1 or 2 has a negative value, a base current flows into the transistor Q3 or Q4. By amplification working of the transistor Q3 or Q4, a gate voltage of the switching element Q21 or Q22 decreases.

Namely, gate signals are alternately input in the switching elements Q21 and Q22 such that the second converter 4 works to be out of phase with the first converter 3*a* by 90 degrees while having the same frequency as the first converter 3*a*. As well as the exemplary embodiment 1, this decreases the ripple current of the output smoothing capacitor Co1.

Next, a modified example of a drive circuit of the exemplary embodiment 3 in which the transistors connected in a totem-pole type are provided will be described. When a transistor with saturation is switched to an off state, a delay time occurs in the off state of the transistor due to influence of a small number of carriers. If a voltage having a rectangular wave form is input to a transistor connected in a totem-pole type, the transistor is inversely biased between a base and an emitter thereof at a time when the input voltage is switched. Thus, the small number of carriers is rapidly decreased. Since this shortens the delay time of output, it is widely used as a drive circuit of a switching power-supply.

However, in the exemplary embodiment 3 of the present invention, an input signal for the drive circuit in a totem-pole type is generated by not a voltage source but instead a current source from the series resonance circuit 1 or 2. Thus, even if a current in the series resonance circuit 1 or 2 is inverted, a transistor can not be turned off until the current value reaches a charge amount of the small number of carriers accumulated in a base of the transistor. Therefore, the delay time occurs with respect to the switching of current direction.

Figure 9:
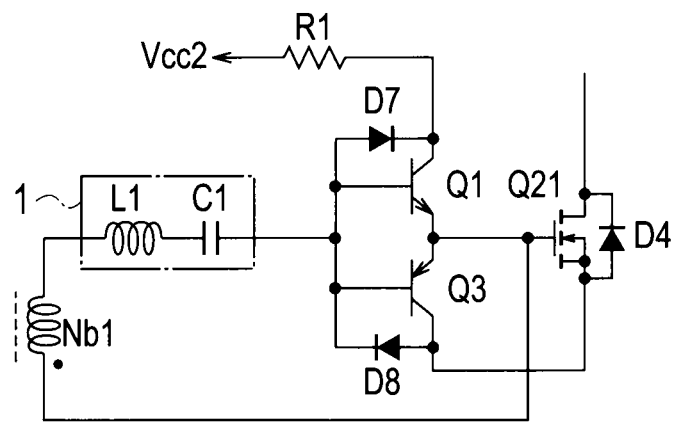
FIG. 9 It is a circuit diagram in a first modified example of the switching power-supply apparatus according to the exemplary embodiment 3.

FIG. 9 is a circuit diagram in a first modified example of the switching power-supply apparatus according to the exemplary embodiment 3. The first modified example resolves the delay time of the drive circuit. The first modified example in FIG. 9 differs from the exemplary embodiment 3 in FIG. 8 in a drive circuit. A description of common portion other than the drive circuit is omitted.

In FIG. 9, diodes D7 and D8 with low voltage drop in the forward direction such as schottky barrier diodes are provided between the collector and the base of the transistor Q1 and between the collector and the base of the transistor Q3. It is noted that diodes are similarly provided with respect to the transistors Q2 and Q4 (not shown).

This configuration flows a current in the series resonance circuit 1 or 2, which is flowing in the base at a time when the transistor Q1 or Q3 is switched in the off state, between the collector and the emitter of the transistor Q1 or between the collector and the emitter of the transistor Q3 through the diodes D7 or D8 (first diode). Thus, extra charge is not accumulated in the bases of the transistors Q1 and Q3, which shortens the delay time from a time when the current in the series resonance circuit 1 or 2 is inverted.

Figure 10:
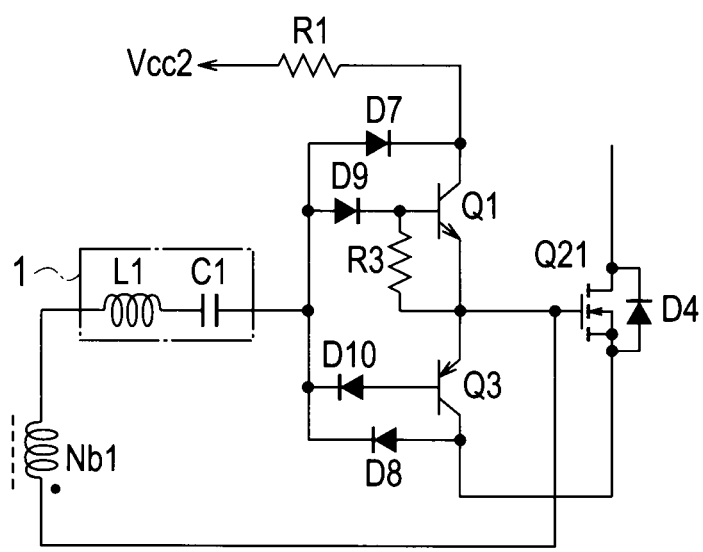
FIG. 10 It is a circuit diagram in a second modified example of the switching power-supply apparatus according to the exemplary embodiment 3.

FIG. 10 is a circuit diagram in a second modified example of the switching power-supply apparatus according to the exemplary embodiment 3. The second modified example in FIG. 10 differs from the first modified example in FIG. 9 in that diodes D9 and D10 (second diode) are provided between the series resonance circuit 1 and the bases of the transistors Q1 and Q3 and a resistor R3 is provided between the base and the emitter of the transistor Q1. It is noted that diodes and a resistor are similarly provided with respect to the transistors Q2 and Q4 (not shown).

As well as the drive circuit shown in FIG. 9, this configuration shortens the delay time which occurs in the off state of the transistor Q1 or Q3. In addition, when a current in the series resonance circuit 1 or 2 is switched from a negative value to a positive value, the transistor Q1 is not turned on immediately because a current flows into the resistor R3 at the beginning. After voltage drop of the resistor R3 reaches a voltage between the base and the emitter of the transistor Q1, a base current flows to turn on the transistor Q1. Accordingly, it is possible to adjust a timing (that is a dead time) of switching of the switching element Q21 or Q22 from an off state into an on state, using a resistor value of the resistor R1 or R2.

Exemplary Embodiment 4

Figure 11:
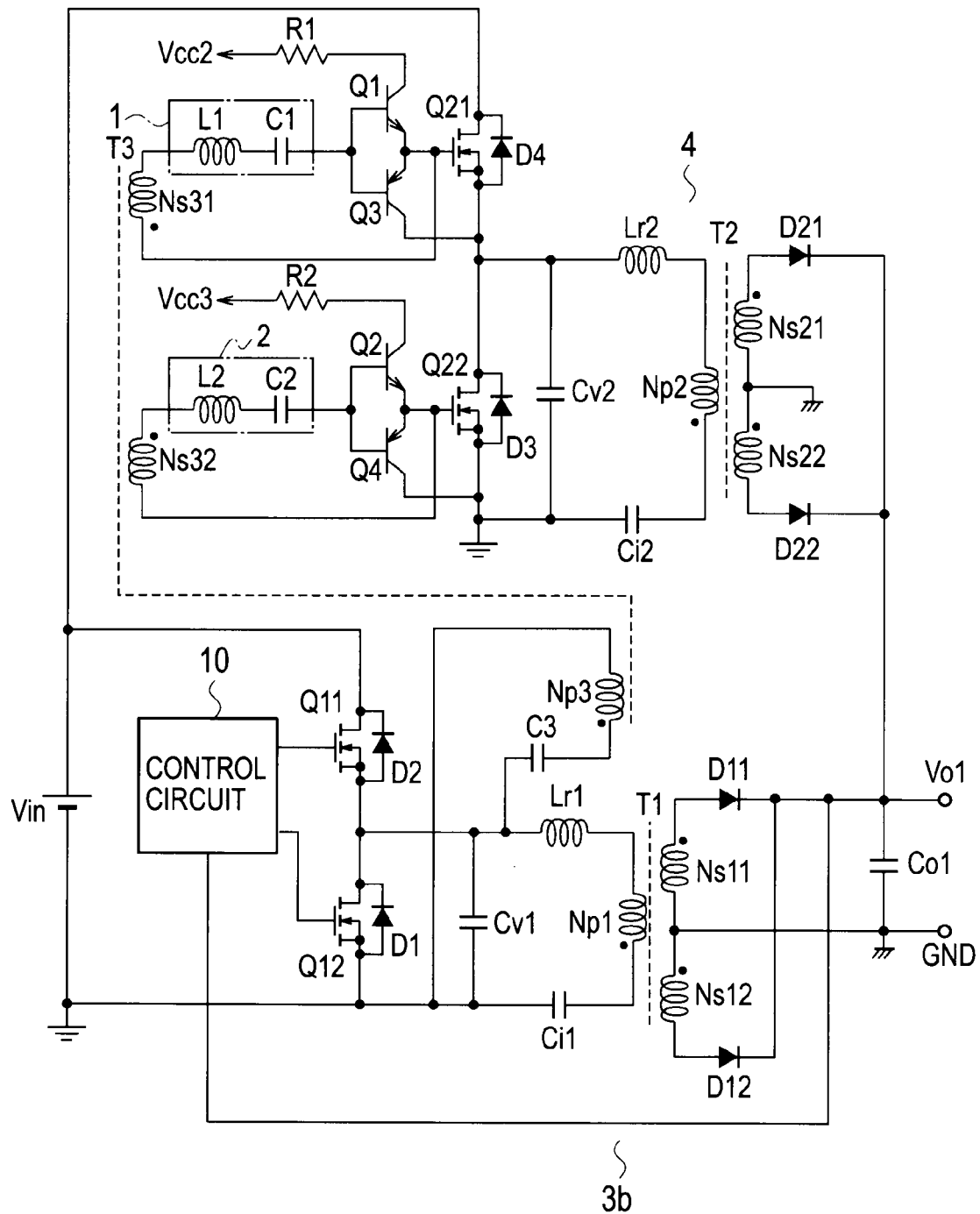
FIG. 11 It is a circuit diagram illustrating a configuration of a switching power-supply apparatus according to an exemplary embodiment 4 of the present invention.

FIG. 11 is a circuit diagram illustrating a configuration of a switching power-supply apparatus according to the exemplary embodiment 4 of the present invention. In the exemplary embodiment 3 illustrated in FIG. 8, the series resonance circuits 1 and 2 are connected to the auxiliary windings Nb1 and Nb2 of the transformer T1b.

On the other hand, in the exemplary embodiment 4 illustrated in FIG. 11, a transformer T3 (third transformer) including a primary winding Np3 and secondary windings Ns31 and Ns32 is provided, one end of the series resonance circuit 1 is connected to one end of the secondary winding Ns31 of the transformer T3, and one end of the series resonance circuit 2 is connected to one end of the secondary winding Ns32. A series circuit including a capacitor C3 and the primary winding Np3 of the transformer T3 is connected to both ends of the switching element Q12. It is noted that the transformer T1 configures another transformer.

This configuration can obtain the similar effect as the exemplary embodiment 3 because a voltage generated in the secondary winding Ns31 or Ns32 of the transformer T3 is an alternating-current voltage symmetrically formed on positive and negative regions.

Exemplary Embodiment 5

The methods for carrying out concurrent working of the first converter and the second converter while the first converter is out of phase with the second converter are described in the exemplary embodiments 1 to 4. By the resonance working of the first resonance circuit including the resonance reactor Lr1, the primary winding Np1 of the transformer T1a and the current resonance capacitor Ci1 and the resonance working of the second resonance circuit including the resonance reactor Lr2, the primary winding Np2 of the transformer T2 and the current resonance capacitor Ci2, the first and second converters vary amplitudes of the current resonance capacitors Ci1 and Ci2 to generate voltages in the secondary windings Ns11, Ns12, Ns21 and Ns22, which transfers energy.

Thus, there may be a case where the voltages generated in the secondary windings Ns11, Ns12, Ns21 and Ns22 of the transformers T1a and T2 differ widely from one another due to variations of the resonance reactors Lr1 and Lr2, inductance of the primary winding and capacitances of the current resonance capacitors Ci1 and Ci2. At a side where a secondary winding voltage is low, the secondary winding voltage is lower than a voltage of the output smoothing capacitor Co1 because a controller for controlling a current is not provided between the rectifier diodes D11, D12, D21, D22 and the output smoothing capacitor Co1 at the secondary sides of the transformers T1a and T2. This does not conduct the rectifier diodes D11 and D12 or the rectifier diodes D21 and D22, which supplies electric power by only one of two converters 3 and 4. Namely, one converter is burdened with supply of electric power which is to be supplied by two converters 3 and 4. This has a possibility that each switching element produces heat.

Figure 12:
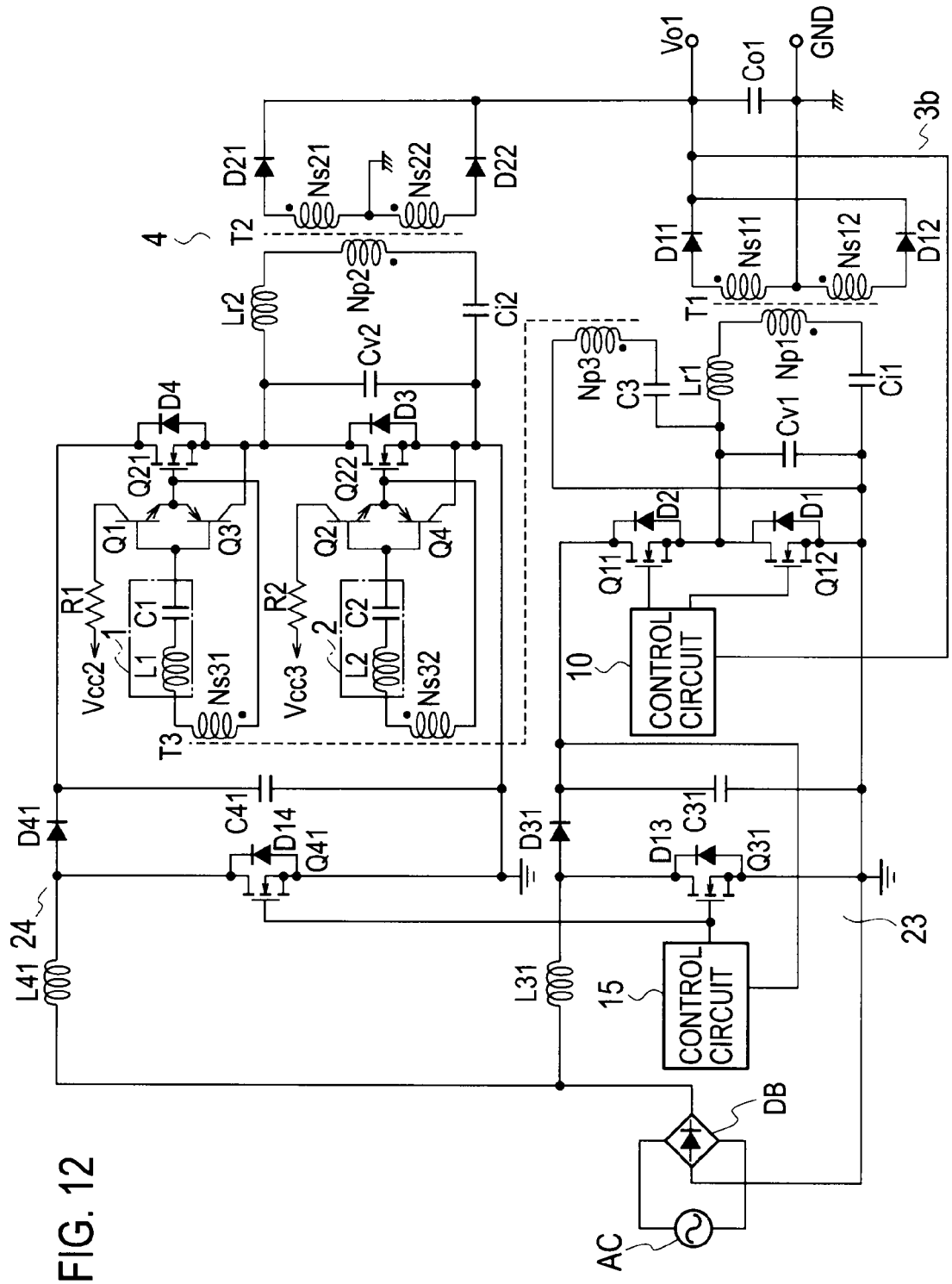
FIG. 12 It is a circuit diagram illustrating a configuration of a switching power-supply apparatus according to an exemplary embodiment 5 of the present invention.

A switching power-supply apparatus of the exemplary embodiment 5 is one that resolves this problem. FIG. 12 is a circuit diagram illustrating a configuration of the switching power-supply apparatus according to an exemplary embodiment 5 of the present invention. The switching power-supply apparatus of the exemplary embodiment 5 shown in FIG. 12 differs from the switching power-supply apparatus of the exemplary embodiment 4 shown in FIG. 11 in that, instead of the direct-current power-supply Vin, there are provided an alternating-current power-supply AC, a fully-wave rectifying circuit DB, a first PFC circuit 23 (first power factor improvement circuit) including a booster reactor L31, a switching element Q31 (first switch) consisting of MOSFET, a diode D31 and a capacitor C31 (first direct-current power-supply), a second PFC circuit 24 (second power factor improvement circuit) including a booster reactor L41, a switching element Q41 (second switch) consisting of MOSFET, a diode D41 and a capacitor C41 (second direct-current power-supply), and a control circuit 15.

The first PFC circuit 23 is connected to both ends of a series circuit including the switching element Q11 and the switching element Q12. The first PFC circuit 23 turns on/off the switching element Q31 using a control by the control circuit 15 to improve a power factor, and converts into a certain direct-current voltage a rectified voltage generated by rectifying an alternating-current voltage of the alternating-current power-supply AC using the full-wave rectifying circuit DB.

The second PFC circuit 24 is connected to both ends of a series circuit including the switching element Q21 and the switching element Q22. The second PFC circuit 24 turns on/off the switching element Q41 using a control by the control circuit 15 to improve a power factor, and converts into a direct-current voltage with a turn-on width, which is the same as a turn-on width of the first PFC circuit 23, a rectified voltage generated by rectifying an alternating-current voltage of the alternating-current power-supply AC using the full-wave rectifying circuit DB.

Two PFC circuits 23 and 24 are controlled by one control circuit 15. Namely, only an output voltage of the first PFC circuit 23 located at a side connected to the first converter 3b is controlled by the control circuit 15, and an output voltage of the second PFC circuit 24 is not monitored and is gotten to work with a turn-on width (a turn-on width of the switching element Q31) which is the same as a turn-on width (a turn-on width of the switching element Q41) of the first PFC circuit 23 to be voltage-controlled.

In the above-described configuration, in a case where there is not variability between the first resonance circuit and the second resonance circuit, two PFC circuits 23 and 24 have substantially the same output voltage. On the other hand, in a case where there is variability between the first resonance circuit and the second resonance circuit, electric power at the secondary side of the transformer T1 in the first converter 3b differs from electric power at the secondary side of the transformer T2 in the second converter 4.

In a case where electric power which the second converter 4 outputs is larger than electric power which the first converter 3b outputs, an output voltage of the second PFC circuit 24 is lower than an output voltage of the first PFC circuit 23. On the other hand, in a case where electric power which the second converter 4 outputs is smaller than electric power which the first converter 3b outputs, an output voltage of the second PFC circuit 24 is higher than an output voltage of the first PFC circuit 23.

Thus, when voltages input into the first converter 3b and the second converter 4 vary, a voltage of the current resonance capacitor Ci2 varies to change voltages generated in the secondary windings Ns21 and Ns22 of the transformer T2. For example, in a case where electric power which the second converter 4 outputs is larger than electric power which the first converter 3b outputs, an output voltage of the second PFC circuit 24 decreases to decrease voltages generated in the secondary windings Ns21 and Ns22 of the transformer T2, which reduces the electric power which the second converter 4 outputs. This gets the first converter 3b and the second converter 4 to stably work in a state where electric powers which the first converter 3b and the second converter 4 output equilibrate. Namely, current balance of two converters 3b and 4 is realized by only adding the PFC circuits 23 and 24 without performing a complex control.

Exemplary Embodiment 6

Figure 13:
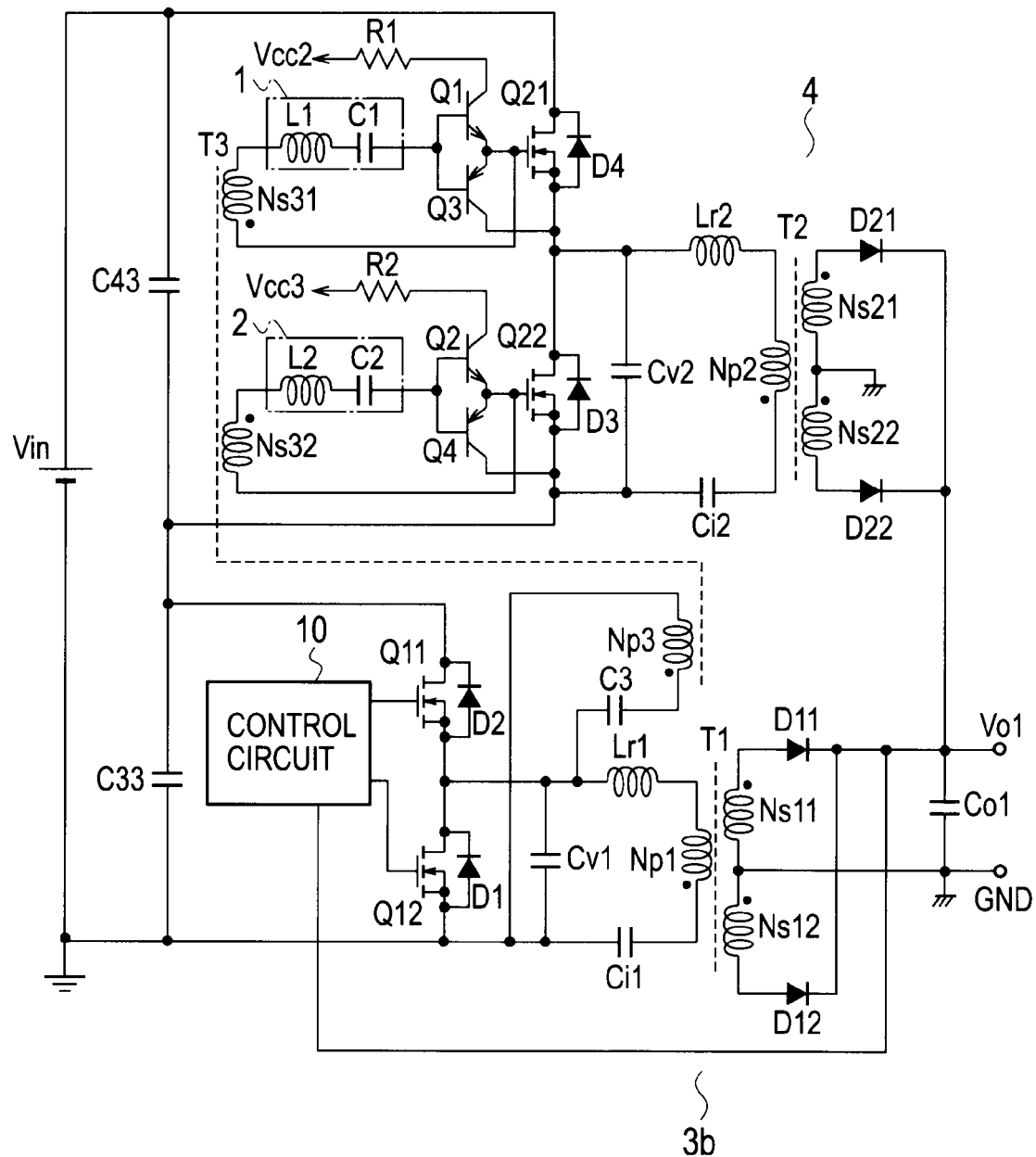
FIG. 13 It is a circuit diagram illustrating a configuration of a switching power-supply apparatus according to an exemplary embodiment 6 of the present invention.

FIG. 13 is a circuit diagram illustrating a configuration of a switching power-supply apparatus according to an exemplary embodiment 6 of the present invention. In the exemplary embodiment 6, a voltage dividing capacitor C33 (first voltage dividing capacitor and first direct-current power-supply) and a voltage dividing capacitor C43 (second voltage dividing capacitor and second direct-current power-supply) are connected to both ends of the direct-current power-supply Vin in series.

The series circuit including the switching element Q11 and the switching element Q12 is connected to both ends of the voltage dividing capacitor C33. The series circuit including the switching element Q21 and the switching element Q22 is connected to both ends of the voltage dividing capacitor C43.

In a case where electric power which the first converter 3b supplies to an output is equal to electric power which the second converter 4 supplies to the output, each of a voltage between both ends of the voltage dividing capacitor C33 and a voltage between both ends of the voltage dividing capacitor C43 is equal to a voltage generated by dividing a direct-current voltage of the direct-current power-supply Vin in half.

On the other hand, in a case where there is variability between the first resonance circuit and the second resonance circuit and electric power which the converter 3b supplies to an output differs from electric power which the converter 4 supplies to the output, there is a difference in voltage dividing ratios of the voltage dividing capacitor C33 and the voltage dividing capacitor C43. For example, when electric power which the second converter 4 outputs is larger than electric power which the first converter 3b outputs, a voltage between both ends of the voltage dividing capacitor C43 decreases in comparison with a voltage between both ends of the voltage dividing capacitor C33.

Namely, an input voltage of the second converter 4 decreases to decrease voltages generated in the secondary windings Ns21 and Ns22 of the transformer T2, which reduces electric power which the second converter 4 outputs. This gets the first converter 3b and the second converter 4 to stably work in a state where electric powers which the first converter 3b and the second converter 4 output equilibrate.

On the other hand, when electric power which the second converter 4 outputs is smaller than electric power which the first converter 3b outputs, a voltage between both ends of the voltage dividing capacitor C43 increases in comparison with a voltage between both ends of the voltage dividing capacitor C33. Namely, an input voltage of the second converter 4 increases to increase voltages generated in the secondary windings Ns21 and Ns22 of the transformer T2, which increases electric power which the second converter 4 outputs. This gets the first converter 3b and the second converter 4 to stably work in a state where electric powers which the first converter 3b and the second converter 4 output equilibrate. Namely, current balance of two converters 3b and 4 is realized by this simple configuration.

It is noted that the present invention is not limited to the above-described exemplary embodiments. Although the current resonance type switching power-supply apparatuses are cited as examples in the exemplary embodiments 1 to 6, the present invention may be applied to a push-pull type switching power-supply apparatus.

The first PFC circuit 23 and the second PFC circuit 24 of the switching power-supply apparatus in the exemplary embodiment 5 illustrated in FIG. 12 may be applied to the switching power-supply apparatus in any of the exemplary embodiments 1 to 3.

The voltage dividing capacitor C33 and the voltage dividing capacitor C43 of the switching power-supply apparatus in the exemplary embodiment 6 illustrated in FIG. 13 may be applied to the switching power-supply apparatus in any of the exemplary embodiments 1 to 3.

REFERENCE SIGNS LIST 1, 2 series resonance circuit
3, 3a, 3b first converter
4 second converter
10, 11, 15 control circuit
12 inverter circuit
13, 14 driver
23 first PFC circuit
24 second PFC circuit
Vin direct-current power-supply
Q11, Q12, Q21, Q22, Q31, Q41 switching element
Q1 to Q4 transistor
D1 to D12, D21, D22, D31, D41 diode
T1, T1a, T1b, T2, T3 transformer
Np1, Np2, Np3 primary winding
Ns11, Ns12, Ns21, Ns22, Ns31, Ns32 secondary winding
Na1, Nb1, Nb2 auxiliary winding
C33, C43 voltage dividing capacitor
Co1 output smoothing capacitor
L31, L41 booster reactor
Lr1, Lr2, L1, L2 resonance reactor
C1, C2 resonance capacitor
Ci1, Ci2 current resonance capacitor
Cv1, Cv2 voltage resonance capacitor
R1, R2 resistor
AC alternating-current power-supply
DB fully-wave rectifying circuit

The invention claimed is:

1. A switching power-supply apparatus comprising:
a first transformer including a primary winding, a secondary winding and an auxiliary winding;
a second transformer including a primary winding and a secondary winding;
a first converter in which a first switching element and a second switching element are connected to both ends of a direct-current power-supply in series, and a first capacitor and the primary winding of the first transformer are connected to both ends of the first switching element or the second switching element in series, wherein the first converter includes a first rectifying circuit that rectifies a voltage generated in the secondary winding of the first transformer;
a second converter in which a third switching element and a fourth switching element are connected to both ends of the direct-current power-supply in series, and a second capacitor and the primary winding of the second transformer are connected to both ends of the third switching element or the fourth switching element in series, wherein the second converter includes a second rectifying circuit that rectifies a voltage generated in the secondary winding of the second transformer;
a smoothing circuit that smoothes currents output from the first rectifying circuit and the second rectifying circuit;
a series resonance circuit that includes a resonance reactor and a resonance capacitor and is connected to the auxiliary winding of the first transformer in series; and
a control circuit that turns on/off the third switching element and the fourth switching element according to a polarity of a current flowing in the series resonance circuit, wherein a phase of the current is delayed by 90 degrees with respect to a phase of a voltage generated in the auxiliary winding of the first transformer,
wherein the second converter is operated out of phase with the first converter by 90 degrees.

2. The switching power-supply apparatus according to claim 1, wherein the control circuit turns on the third switching element when a current flowing in the series resonance circuit is positive, and turns on the fourth switching element when a current flowing in the series resonance circuit is negative.

3. The switching power-supply apparatus according to claim 1, wherein a first power factor improvement circuit and a second power factor improvement circuit are substituted for the direct-current power-supply,
the first power factor improvement circuit turns on/off a rectified voltage generated by rectifying an alternating-current voltage of an alternating-current power-supply using a first switch to improve a power factor, and converts the rectified voltage into a certain direct-current voltage and supplies the certain direct-current voltage to the first converter, and
the second power factor improvement circuit turns on/off a rectified voltage generated by rectifying the alternating-current voltage using a second switch to improve a power factor, and converts the rectified voltage into a direct-current voltage with a turn-on width which is the same as a turn-on width of the first switch of the first power factor improvement circuit and supplies the direct-current voltage to the second converter.

4. The switching power-supply apparatus according to claim 1, wherein a voltage dividing direct-current power-supply is substituted for the direct-current power-supply,
a first voltage dividing capacitor and a second voltage dividing capacitor are connected to both ends of the voltage dividing direct-current power-supply in series,
a direct-current voltage of the first voltage dividing capacitor is supplied to the first converter, and
a direct-current voltage of the second voltage dividing capacitor is supplied to the second converter.

5. A switching power-supply apparatus comprising:
a first transformer including a primary winding, a secondary winding, a first auxiliary winding and a second auxiliary winding wound to have a reversed polarity with respect to the first auxiliary winding;
a second transformer including a primary winding and a secondary winding;
a first converter in which a first switching element and a second switching element are connected to both ends of a direct-current power-supply in series, and a first capacitor and the primary winding of the first transformer are connected to both ends of the first switching element or the second switching element in series, wherein the first converter includes a first rectifying circuit that rectifies a voltage generated in the secondary winding of the first transformer;
a second converter in which a third switching element and a fourth switching element are connected to both ends of the direct-current power-supply in series, and a second capacitor and the primary winding of the second transformer are connected to both ends of the third switching element or the fourth switching element in series, wherein the second converter includes a second rectifying circuit that rectifies a voltage generated in the secondary winding of the second transformer;
a smoothing circuit that smoothes currents output from the first rectifying circuit and the second rectifying circuit;
a first series resonance circuit that includes a first resonance reactor and a first resonance capacitor and is connected to the first auxiliary winding of the first transformer in series;
a first control circuit that turns on/off the third switching element according to a polarity of a current of the first series resonance circuit, wherein a phase of the current is delayed by 90 degrees with respect to a phase of a voltage generated in the first auxiliary winding of the first transformer;
a second series resonance circuit that includes a second resonance reactor and a second resonance capacitor and is connected to the second auxiliary winding of the first transformer in series; and
a second control circuit that turns on/off the fourth switching element according to a polarity of a current of the second series resonance circuit, wherein a phase of the current is delayed by 90 degrees with respect to a phase of a voltage generated in the auxiliary winding of the first transformer,
wherein the second converter is operated out of phase with the first converter by 90 degrees.

6. The switching power-supply apparatus according to claim 5, wherein a first power factor improvement circuit and a second power factor improvement circuit are substituted for the direct-current power-supply,
the first power factor improvement circuit turns on/off a rectified voltage generated by rectifying an alternating-current voltage of an alternating-current power-supply using a first switch to improve a power factor, and converts the rectified voltage into a certain direct-current voltage and supplies the certain direct-current voltage to the first converter, and the second power factor improvement circuit turns on/off a rectified voltage generated by rectifying the alternating-current voltage using a second switch to improve a power factor, and converts the rectified voltage into a direct-current voltage with a turn-on width which is the same as a turn-on width of the first switch of the first power factor improvement circuit and supplies the direct-current voltage to the second converter.

7. The switching power-supply apparatus according to claim 5, wherein a voltage dividing direct-current power-supply is substituted for the direct-current power-supply,
a first voltage dividing capacitor and a second voltage dividing capacitor are connected to both ends of the voltage dividing direct-current power-supply in series,
a direct-current voltage of the first voltage dividing capacitor is supplied to the first converter, and
a direct-current voltage of the second voltage dividing capacitor is supplied to the second converter.

8. A switching power-supply apparatus comprising:
a first converter in which a first switching element and a second switching element are connected to both ends of a direct-current power-supply in series, and a first capacitor and a primary winding of a first transformer including a first auxiliary winding and a second auxiliary winding, each of which is wound to have a reversed polarity with respect to the other winding, are connected to both ends of the first switching element or the second switching element in series, wherein the first converter includes a first rectifying circuit that rectifies a voltage generated in a secondary winding of the first transformer;
a second converter in which a third switching element and a fourth switching element are connected to the both ends of the direct-current power-supply in series, and a second capacitor and a primary winding of a second transformer are connected to both ends of the third switching element or the fourth switching element in series, wherein the second converter includes a second rectifying circuit that rectifies a voltage generated in a secondary winding of the second transformer;
a smoothing circuit that smoothes currents output from the first rectifying circuit and the second rectifying circuit;
a first series resonance circuit that includes a first resonance reactor and a first resonance capacitor and is connected to the first auxiliary winding in series;
a first control circuit that turns on/off the third switching element according to a current of the first series resonance circuit;
a second series resonance circuit that includes a second resonance reactor and a second resonance capacitor and is connected to the second auxiliary winding in series; and
a second control circuit that turns on/off the fourth switching element according to a current of the second series resonance circuit,
wherein the first control circuit includes a first drive circuit in which first and second transistors totem-pole connected are included, respective base terminals of the first and second transistors are connected to one end of a series circuit including the first series resonance circuit and the first auxiliary winding, and respective emitter terminals of the first and second transistors are connected to the other end of the series circuit including the first series resonance circuit and the first auxiliary winding and a control terminal of the third switching element, and the second control circuit includes a second drive circuit in which third and fourth transistors totem-pole connected are included, respective base terminals of the third and fourth transistors are connected to one end of a series circuit including the second series resonance circuit and the second auxiliary winding, and respective emitter terminals of the third and fourth transistors are connected to the other end of the series circuit including the second series resonance circuit and the second auxiliary winding and a control terminal of the fourth switching element.

9. The switching power-supply apparatus according to claim 8, wherein each of the first drive circuit and the second drive circuit includes a diode connected between a base terminal and a collector terminal of each transistor.

10. A switching power-supply apparatus comprising:
a first converter in which a first switching element and a second switching element are connected to both ends of a direct-current power-supply in series, and a first capacitor and a primary winding of a first transformer a first auxiliary winding and a second auxiliary winding, each of which is would to have reversed polarity with respect to the other winding, are connected to both ends of the first switching element or the second switching element in series, wherein the first converter includes a first rectifying circuit that rectifies a voltage generated in a secondary winding of the first transformer;
a second converter in which a third switching element and a fourth switching element are connected to the both ends of the direct-current power-supply in series, and a second capacitor and a primary winding of a second transformer are connected to both ends of the third switching element or the fourth switching element in series, wherein the second converter includes a second rectifying circuit that rectifies a voltage generated in a secondary winding of the second transformer;
a smoothing circuit that smoothes currents output from the first rectifying circuit and the second rectifying circuit;
a first series resonance circuit that includes a first resonance reactor and a first resonance capacitor and is connected to the first auxiliary winding in series;
a first control circuit that turns on/off the third switching element according to a current of the first series resonance circuit;
a second series resonance circuit that includes a second resonance reactor and a second resonance capacitor and is connected to the second auxiliary winding in series; and
a second control circuit that turns on/off the fourth switching element according to a current of the second series resonance circuit,
wherein the first control circuit includes a first drive circuit in which first and second transistors totem-pole connected are included, respective base terminals and respective collector terminals of the first and second transistors are connected to one end of a series circuit including the first series resonance circuit and the first auxiliary winding via diodes, respective emitter terminals of the first and second transistors are connected to the other end of the series circuit including the first series resonance circuit and the first auxiliary winding and a control terminal of the third switching element, and a resistor is connected between the base terminal and the emitter terminal of the first transistor and
the second control circuit includes a second drive circuit in which third and fourth transistors totem-pole connected are included, respective base terminals and respective collector terminals of the third and fourth transistors are connected to one end of a series circuit including the second series resonance circuit and the second auxiliary winding via diodes, respective emitter terminals of the third and fourth transistors are connected to the other end of the series circuit including the second series resonance circuit and the second auxiliary winding and a control terminal of the fourth switching element, and a resistor is connected between the base terminal and the emitter terminal of the third transistor.

11. A switching power-supply apparatus comprising:
a first transformer including a primary winding and a secondary winding;
a second transformer including a primary winding and a secondary winding;
a first converter in which a first switching element and a second switching element are connected to both ends of a direct-current power-supply in series, and a first capacitor and the primary winding of the first transformer are connected to both ends of the first switching element or the second switching element in series, wherein the first converter includes a first rectifying circuit that rectifies a voltage generated in the secondary winding of the first transformer;
a second converter in which a third switching element and a fourth switching element are connected to both ends of the direct-current power-supply in series, and a second capacitor and the primary winding of the second transformer are connected to both ends of the third switching element or the fourth switching element in series, wherein the second converter includes a second rectifying circuit that rectifies a voltage generated in the secondary winding of the second transformer;
a smoothing circuit that smoothes currents output from the first rectifying circuit and the second rectifying circuit;
a series resonance circuit that includes a resonance reactor and a resonance capacitor connected to both ends of the first switching element or the second switching element; and
a control circuit that turns on/off the third switching element and the fourth switching element according to a polarity of a current flowing in the series resonance circuit, wherein a phase of the current is delayed by 90 degrees with respect to a phase of a voltage generated in the primary winding of the first transformer,
wherein the second converter is operated out of phase with the first converter by 90 degrees.

12. The switching power-supply apparatus according to claim 11, wherein a first power factor improvement circuit and a second power factor improvement circuit are substituted for the direct-current power-supply,
the first power factor improvement circuit turns on/off a rectified voltage generated by rectifying an alternating-current voltage of an alternating-current power-supply using a first switch to improve a power factor, and converts the rectified voltage into a certain direct-current voltage and supplies the certain direct-current voltage to the first converter, and
the second power factor improvement circuit turns on/off a rectified voltage generated by rectifying the alternating-current voltage using a second switch to improve a power factor, and converts the rectified voltage into a direct-current voltage with a turn-on width which is the same as a turn-on width of the first switch of the first power factor improvement circuit and supplies the direct-current voltage to the second converter.

13. The switching power-supply apparatus according to claim 11, wherein a voltage dividing direct-current power-supply is substituted for the direct-current power-supply,
a first voltage dividing capacitor and a second voltage dividing capacitor are connected to both ends of the voltage dividing direct-current power-supply in series,
a direct-current voltage of the first voltage dividing capacitor is supplied to the first converter, and
a direct-current voltage of the second voltage dividing capacitor is supplied to the second converter.

14. A switching power-supply apparatus comprising:
a first transformer including a primary winding, a secondary winding and an auxiliary winding;
a second transformer including a primary winding and a secondary winding;
a third transformer including a primary winding, a first secondary winding and a second secondary winding wound to have a reversed polarity with respect to the first secondary winding;
a first converter in which a first switching element and a second switching element are connected to both ends of a direct-current power-supply in series, a first capacitor and the primary winding of the first transformer are connected to both ends of the first switching element or the second switching element in series, and third capacitor and the primary winding of the third transformer are connected to both ends of the first switching element or the second switching element in series, wherein the first converter includes a first rectifying circuit that rectifies a voltage generated in the secondary winding of the first transformer;
a second converter in which a third switching element and a fourth switching element are connected to both ends of the direct-current power-supply in series, and a second capacitor and the primary winding of the second transformer are connected to both ends of the third switching element or the fourth switching element in series, wherein the second converter includes a second rectifying circuit that rectifies a voltage generated in the secondary winding of the second transformer;
a smoothing circuit that smoothes currents output from the first rectifying circuit and the second rectifying circuit;
a first series resonance circuit that includes a first resonance reactor and a first resonance capacitor and is connected to the first secondary winding of the third transformer in series;
a first control circuit that turns on/off the third switching element according to a polarity of a current flowing in the first series resonance circuit, wherein a phase of the current is delayed by 90 degrees with respect to a phase of a voltage generated in the first secondary winding of the third transformer;
a second series resonance circuit that includes a second resonance reactor and a second resonance capacitor and is connected to the second secondary winding of the third transformer in series; and
a second control circuit that turns on/off the fourth switching element according to a polarity of a current flowing in the second series resonance circuit, wherein a phase of the current is delayed by 90 degrees with respect to a phase of a voltage generated in the second secondary winding of the third transformer,
wherein the second converter is operated out of phase with the first converter by 90 degrees.

15. The switching power-supply apparatus according to claim 14, wherein a first power factor improvement circuit and a second power factor improvement circuit are substituted for the direct-current power-supply, the first power factor improvement circuit turns on/off a rectified voltage generated by rectifying an alternating-current voltage of an alternating-current power-supply using a first switch to improve a power factor, and converts the rectified voltage into a certain direct-current voltage and supplies the certain direct-current voltage to the first converter, and the second power factor improvement circuit turns on/off a rectified voltage generated by rectifying the alternating-current voltage using a second switch to improve a power factor, and converts the rectified voltage into a direct-current voltage with a turn-on width which is the same as a turn-on width of the first switch of the first power factor improvement circuit and supplies the direct-current voltage to the second converter.

16. The switching power-supply apparatus according to claim 14, wherein a voltage dividing direct-current power-supply is substituted for the direct-current power-supply, a first voltage dividing capacitor and a second voltage dividing capacitor are connected to both ends of the voltage dividing direct-current power-supply in series, a direct-current voltage of the first voltage dividing capacitor is supplied to the first converter, and a direct-current voltage of the second voltage dividing capacitor is supplied to the second converter.

* * * * *